United States Patent
Osara et al.

(10) Patent No.: US 8,955,657 B2
(45) Date of Patent: Feb. 17, 2015

(54) MINING VEHICLE AND METHOD FOR ITS ENERGY SUPPLY

(75) Inventors: Jukka Osara, Tampere (FI); Mikko Kouvo, Tampere (FI); Juha Piipponen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 259 days.

(21) Appl. No.: 13/519,421

(22) PCT Filed: Dec. 27, 2010

(86) PCT No.: PCT/FI2010/051088
§ 371 (c)(1),
(2), (4) Date: Jun. 27, 2012

(87) PCT Pub. No.: WO2011/080393
PCT Pub. Date: Jul. 7, 2011

(65) Prior Publication Data
US 2012/0298004 A1  Nov. 29, 2012

(30) Foreign Application Priority Data

Dec. 28, 2009 (FI) ..................................... 20096403
May 25, 2010 (FI) ..................................... 20105580

(51) Int. Cl.
*B60L 1/00* (2006.01)
*B60M 1/12* (2006.01)
(Continued)

(52) U.S. Cl.
CPC ... *B60L 9/18* (2013.01); *B60L 9/12* (2013.01); *B60L 11/1801* (2013.01);
(Continued)

(58) Field of Classification Search
USPC ................ 191/2, 3, 22 R, 29 R, 33 R, 40, 41; 318/139, 244, 245; 180/2.1, 65.1, 180/65.21, 65.8
See application file for complete search history.

(56) References Cited

U.S. PATENT DOCUMENTS 4,284,368 A  8/1981 Albright
5,293,947 A *  3/1994 Stratton .................. 180/2.1
(Continued)

FOREIGN PATENT DOCUMENTS

CA  2 784 670  7/2011
CN  1048360  1/1991
(Continued)

OTHER PUBLICATIONS

English translation of Office Action for Japanese Patent Application No. 2012-546477, dated Aug. 27, 2013.
(Continued)

*Primary Examiner* — R. J. McCarry, Jr.
(74) *Attorney, Agent, or Firm* — Morgan, Lewis & Bockius LLP

(57) ABSTRACT

The invention relates to a mining vehicle and method for its energy supply. The mining vehicle has a carriage, driving equipment for moving the carriage, and at least one mining work device. Further, the mining vehicle has at least one electric motor for operating a main function of the mining vehicle, and at least one electric motor for operating an auxiliary function of the mining vehicle. The mining vehicle further has a power-generating auxiliary unit. When necessary, the power-generating auxiliary unit supplies at least part of the power required by the electric motor operating the auxiliary function.

19 Claims, 3 Drawing Sheets

(51) Int. Cl.
  *B60L 9/18*   (2006.01)
  *B60L 9/12*   (2006.01)
  *B60L 11/18*   (2006.01)
  *E21B 7/02*   (2006.01)
  *B60K 1/00*   (2006.01)

(52) U.S. Cl.
  CPC ............ *B60L 11/1811* (2013.01); *E21B 7/025* (2013.01); *B60L 11/18* (2013.01); *B60K 1/00* (2013.01); *B60L 2200/40* (2013.01); *B60L 2210/10* (2013.01); *B60Y 2200/412* (2013.01); *B60Y 2200/49* (2013.01); *Y02T 10/7005* (2013.01); *Y02T 10/7088* (2013.01); *Y02T 10/7216* (2013.01); *Y02T 90/127* (2013.01); *Y02T 90/14* (2013.01)
  USPC ............................................ 191/3; 191/33 R

(56) References Cited

U.S. PATENT DOCUMENTS

| | | | |
|---|---|---|---|
| 5,698,905 | A | 12/1997 | Rüthlein et al. |
| 5,705,859 | A | 1/1998 | Karg et al. |
| 5,990,652 | A | 11/1999 | Meisner |
| 6,422,351 | B2 | 7/2002 | Tajima et al. |
| 7,053,568 | B2 * | 5/2006 | Rudinec ..................... 318/139 |
| 8,027,760 | B2 | 9/2011 | Chattot |
| 2001/0017239 | A1 | 8/2001 | Tajima et al. |
| 2002/0053490 | A1 | 5/2002 | Banno et al. |
| 2004/0245952 | A1 | 12/2004 | Yamada et al. |
| 2009/0267412 | A1 | 10/2009 | Kitanaka |
| 2013/0206490 | A1 | 8/2013 | Kouvo et al. |

FOREIGN PATENT DOCUMENTS

| | | |
|---|---|---|
| CN | 1085169 | 4/1994 |
| CN | 1311150 | 9/2001 |
| CN | 2496170 Y | 6/2002 |
| CN | 101563253 | 10/2009 |
| DE | 19542163 | 1/1997 |
| EP | 0491691 | 7/1992 |
| EP | 0 703 182 A2 | 3/1996 |
| EP | 2 051 358 A1 | 4/2009 |
| FI | 112008 B | 10/2003 |
| JP | 6-510418 | 11/1994 |
| JP | 8-508391 | 9/1996 |
| JP | 2000-328900 | 11/2000 |
| JP | 2008-190212 | 8/2008 |
| JP | 2009-248707 | 10/2009 |
| RU | 2 100 221 C1 | 12/1997 |
| WO | WO 2008/129128 | 10/2008 |

OTHER PUBLICATIONS

Office Action for Canadian Patent Application No. 2,783,724; dated Aug. 16, 2013.
Finnish Office Action for Appln. No. 20096403, dated Oct. 26, 2010.
Search Report for Appln. No. FI20096403, dated Oct. 26, 2010.
Finnish Office Action for Appln. No. 20105580, dated Nov. 4, 2010.
Search Report for Appln. No. FI20105580, dated Nov. 2, 2010.
International Search Report for PCT/FI2010/051088, dated Mar. 24, 2011.
Office Action (with English Translation) for Chinese Patent Application No. 2010-80059778, dated Apr. 21, 2014.

* cited by examiner

MINING VEHICLE AND METHOD FOR ITS ENERGY SUPPLY

RELATED APPLICATIONS

The present application is a U.S. National Phase Application of International Application No. PCT/FI2010/051088 (filed 27 Dec. 2010) which claims priority to Finnish Application Nos. 20096403 (filed 28 Dec. 2009) and 20105580 (filed 25 May 2010).

BACKGROUND OF THE INVENTION

The invention relates to a mining vehicle with a carriage, drive equipment for moving the carriage, at least one mining work device which is one of the following: rock drilling machine, bolting device, shotcrete apparatus, scaling device, injection device, blasthole charger, loading device, measuring device; at least one electric motor for operating the main function of the mining vehicle and at least one electric motor for operating the auxiliary function of the mining vehicle.

The invention further relates to a method for the energy supply of a mining vehicle with a carriage, drive equipment for moving the carriage, at least one mining work device which is one of the following: rock drilling machine, bolting device, shotcrete apparatus, scaling device, injection device, blasthole charger, loading device, measuring device; and at least one electric motor for operating the main function of the mining vehicle and at least one electric motor for operating the auxiliary function of the mining vehicle.

In mines, rock drilling rigs and other mining vehicles are used to perform operations according to the work cycles of the mining work devices at pre-planned work sites. After the necessary tasks, such as borehole drilling, according to the work cycle are performed, the mining vehicle is moved to the next work site and a new work cycle is started. In underground mines, in particular, mining vehicles are generally used, in which the driving energy for the operations according to the work cycles is electricity from an electrical network of the mine. By contrast, transfer drives between work sites are performed by means of driving energy obtained using a combustion engine, typically diesel engine, whereby electric cables or the like do not restrict the transfer drives. However, exhaust gases and noise from a combustion engine cause problems in mines. In addition, a combustion engine requires a lot of space on the carriage of the vehicle, and necessitates regular maintenance. A combustion engine also has adverse effects on the fire safety of the mine, since it has hot surfaces and it is also necessary to store and handle flammable fuel in the vehicle and mine.

Mining vehicles that are continuously connected to the electrical network of the mine are also used in mines. The mining vehicles then have an electric motor, and typically an electric motor with a constant rotation rate is used. The power required by the work phase may then be adjusted with hydraulic components, and the electric motor obtains the electric current and load power defined by the energy consumption of the work phase from the electrical network of the mine. Further, the movement of the mining vehicle is then typically bound to the electrical network or at least to a cable connected thereto and coiled in the mining vehicle or at the fixed electrical network.

Publication U.S. Pat. No. 7,053,568, for example, presents a battery-driven mining vehicle. The publication describes in particular the use and positioning of a set of batteries and alternating current motors as components of drive transmission. A problem with such a mining vehicle that is fully dependent on batteries is the additional weight caused by the transported batteries. In addition, the capacity of the batteries is quite limited, and the batteries of the mining vehicle need to be charged relatively often.

Publication U.S. Pat. No. 5,293,947 presents a mining vehicle that receives its electric supply from an overhead busbar system. The mining vehicle also has a switch for selecting whether the energy used by the mining vehicle is taken from the electrical network or from an auxiliary energy source, such as battery or diesel motor, in the mining vehicle. When the energy is taken from the auxiliary energy source, the mining vehicle can be moved short distances without connecting the mining vehicle to the overhead electrical network.

BRIEF DESCRIPTION OF THE INVENTION

It is an object of the present invention to provide a new type of mining vehicle and a method for its energy supply.

The mining vehicle of the invention is characterised in that it comprises at least one power-generating auxiliary unit and a control unit adapted, when necessary, to connect the power-generating auxiliary unit to supply at least part of the power required by the electric motor using an auxiliary function.

Further, the method of the invention is characterised in that the mining vehicle comprises at least one power-generating auxiliary unit that is, when necessary, connected to supply at least part of the power required by the electric motor using an auxiliary function.

The mining vehicle obtains its energy supply mainly from the electrical network of the mine. The mining vehicle has a carriage, driving equipment for moving the carriage, and at least one mining work device. Further, the mining vehicle has one or more electric motors for operating the mining work device and/or driving equipment and/or some other equipment of the mining vehicle. At least one unit generating capacitive idle power can be connected in parallel to the electric motor supply. Then the inductive idle power generated by the alternating current motor can be compensated as necessary. This means that any poor power transmission capability of the supplying electrical network can be compensated and an as high average drilling power as possible can be obtained. The mining vehicle has at least one electric motor for operating a main function and at least one electrical motor for operating an auxiliary function. The mining vehicle further has a power-generating auxiliary unit. The auxiliary unit generating power at least during the peak load of the electric motor operating the main function generates at least part of the power required by the electric motor operating the auxiliary function.

The present solution makes it possible for instance to even out any load variations caused by the electric motor in the electrical network. This way, in a peak load situation, the current taken from the network can be kept lower than before, whereby the effective load of the mining vehicle decreases. The supply cable of the mining vehicle then need not be dimensioned for the peak power of the mining vehicle. The system can be controlled in such a manner, for example, that at most a certain defined maximum power is taken from the electrical network, and when this limit value is exceeded, the peak of the required effective power is supplied from the power-generating auxiliary unit. Further, when necessary, it is possible to take all the effective power available from the power-generating auxiliary unit and to adjust instead the power taken from the electrical network, or take all the required power from the power-generating auxiliary unit, if the electrical network is not available for some reason.

The mining vehicle comprises one or more of the following mining work devices: a rock drilling machine, bolting machine, shotcreting device, scaling device, injection device, blasthole charger, loading device, measuring device, or drilling, sealing and propellant feeding equipment used in small-charge excavation. The rock drilling machine may be a face drilling device, or a device used in production hole drilling, that is, a long-hole drilling device that drills boreholes in fan-shape. The mining work device is an actuator used in handling undetached rock and performs several consecutive operations according to a given work cycle. Typically, several similar operations are done with the mining work device at one work site. These operations may be defined in an excavation plan, such as a drilling plan, charging plan, or corresponding mining plan. The mining work device is normally arranged to a boom with which the machine is moved during a work cycle. On the other hand, the mining work device may be arranged to a corresponding support or support structure in a mining vehicle, which supports the machine during its work cycle.

BRIEF DESCRIPTION OF THE FIGURES

Some embodiments of the invention will be described in more detail in the attached drawings, in which.

In the figures, some embodiments of the invention are shown simplified for the sake of clarity. Similar parts are marked with the same reference numbers in the figures.

DETAILED DESCRIPTION OF THE INVENTION

Figure 1:
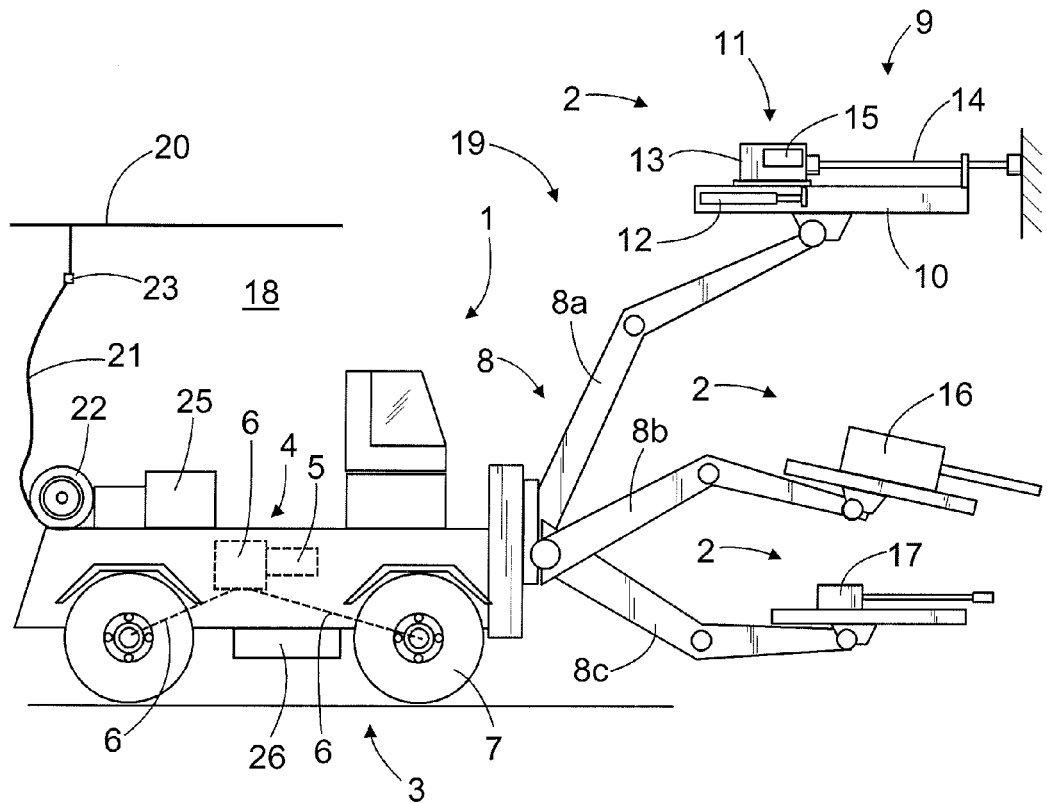
FIG. 1 is a schematic side representation of a mining vehicle, in this case a rock drilling rig.

FIG. 1 shows a rock drilling rig that is one example of a mining vehicle 1 equipped with one or more mining work devices 2. The rock drilling rig comprises a carriage 3 that may be moved by means of drive equipment 4. The drive equipment 4 comprises one or more drive motors 5 and one or more power transmission means 6 for transmitting drive power to one or more wheels 7. The drive power transmission may comprise a mechanical gear system and mechanical power transmission members or, alternatively, the drive power transmission may be hydraulic or electric. There may be one or more booms 8 arranged on the carriage 3, and the boom may be equipped with a mining work device 2. In the embodiment shown in FIG. 1, the first boom 8a is a drilling boom, at the outermost end of which there is a rock drilling unit 9 comprising a feed beam 10, along which a rock drilling machine 11 may be moved by means of a feed device 12. The rock drilling machine 11 may comprise a percussion device 13 for generating impact pulses on a tool and a rotating device 15 for rotating the tool 14 around its longitudinal axis. There may be several of these drilling booms 8a in the rock drilling rigs. By way of example, a second boom 8b is shown to comprise a bolting device 16, with which rock bolts may be arranged in pre-drilled boreholes to support the excavated rock cavern. In the embodiment of FIG. 1, a third boom 8c is equipped with a measuring device 17 for measuring drilled boreholes. Other alternative mining work devices 2 include injection devices used in feeding sealing material into rock, shotcrete processing device, scaling equipment, devices used in small-charge excavation, and devices for feeding explosives.

The mining vehicle 1 is run in accordance with the excavation plan of the mine 18, or a corresponding plan drafted in advance, to a work site 19 where the mining work device 2 performs operations according to a work cycle, the performance of which takes a relatively long time. For instance, the work cycle of a rock drilling machine may include the drilling of several boreholes defined in the drilling plan at the work site 19. Further, the drilling of each borehole typically consists of several work phases, such as collaring, actual drilling, changing extension rods and drill bits, and the dismantling of the extension rod equipment after drilling. Performing a drilling work cycle at a work site 19 may take several hours, sometimes even an entire work shift. Correspondingly, charging, bolting, measuring, and injecting are often quite time-consuming operations. Generally, the use of a mining work device 2 has to do with drilling a borehole or further processing a finished hole. This then means handling undetached rock.

FIG. 1 further shows that the mine 18 has an electrical network 20 that may be fixedly constructed, or it may consist of a modifiable network. The electrical network 20 is typically a three-phase alternating current network. When the mining vehicle 1 is at the work site 19, its mining work device 2, hydraulic system and any necessary auxiliary systems are driven mainly by electrical energy obtained from an external electrical network. The mining vehicle 1 may be connected to the electrical network 20 with one or more connection cables 21. The connection cable 21 may be arranged on a reel 22 and it may be equipped with a suitable connector 23 that may be connected to the supply terminal of the electrical network 20. Alternatively, the reel 22 and cable 21 may be arranged in the mine 18, and the connection cable 21 is connected to the mining vehicle 1. The mining vehicle 1 is equipped with a connecting device 25, through which the electricity supplied from the electrical network 20 is connected to different devices of the mining vehicle 1. The structure and operation of the connecting device 25 is described in more detail in connection with FIGS. 2 to 4.

The mining vehicle 1 is also equipped with at least one power-generating auxiliary unit 26. The power-generating auxiliary unit 26 may be a compensation capacitor generating capacitive idle power or a battery or super capacitor or some other corresponding element generating capacitive idle power. A super capacitor is typically a capacitor battery, in which several high-capacitance low-voltage capacitors are connected in series. In connection with a super capacitor, there is typically a capacitor monitoring system for monitoring the temperatures of the capacitors and the evenness of voltages.

Figure 2:
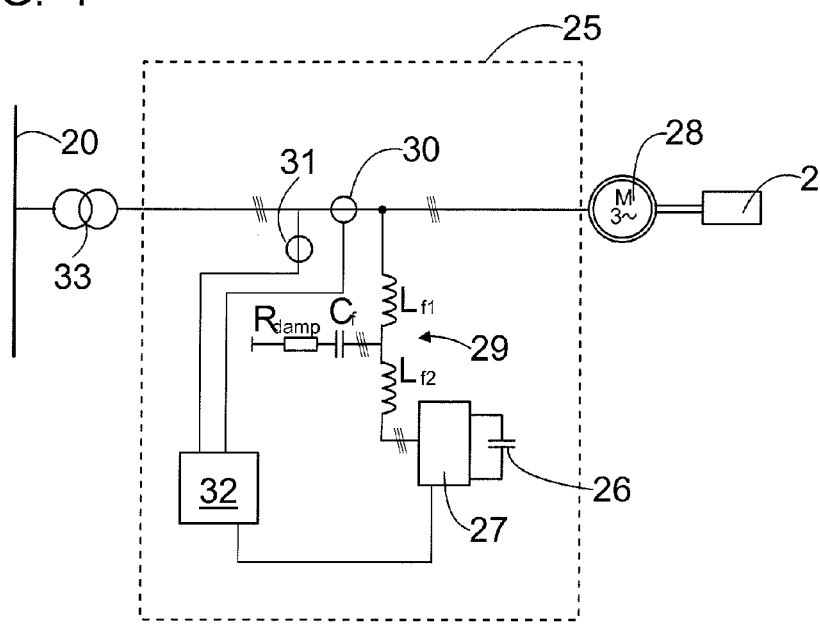
FIG. 2 is a diagram of an energy supply arrangement of a mining vehicle.

In the connecting device 25 shown in FIG. 2, the active control member is a switch 27, with which the power-generating auxiliary unit 26 is connected in parallel to an alternating current motor 28. The alternating current electric motor 28 is preferably a three-phase electric motor. The alternating current motor 28 may operate the mining work device 2, for instance. Typically the mining work device has several alternating current motors, in which case one alternating current motor may operate the driving equipment 4, for instance, and a different alternating current motor 28 may operate auxiliary drives, and a water pump system, air pressure compressor system, auxiliary hydraulics system, or a cooling system of a system in the machine, for example, may be connected to the alternating current motor.

The switch 27 is connected to the input of the alternating current motor 28 through an LCL filter 29. The LCL filter 29 is thus connected between the power-generating auxiliary unit 26 and the input of the alternating current motor. The LCL filter 29 has filter coils $L_{f1}$, $L_{f2}$ and a filter capacitor $C_f$ as shown in FIG. 2. The LCL filter further has a damping resistor $R_{damp}$.

Energy charged in the inductance of the LCL filter 29 may be used to charge the capacitor or set of batteries of the power-generating auxiliary unit 26, for example. On the other hand, the LCL filter 29 reduces harmonics visible to the network, that is, filters the distortion of current and voltage caused by the switch 27.

Current at the supply point of the alternating current motor 28 is measured by a current meter 30 and voltage by a voltage meter 31. The measuring results are transmitted to a control unit 32. The power taken by the alternating current motor 28 is determined from the measured quantities, and the switch 27 is controlled with the control unit 32 on the basis of the measurements. When the power-generating auxiliary unit 26 only compensates idle power, the switch 27 may be relatively simple and the power-generating auxiliary unit 26 relatively small in its energy amount. The power-generating auxiliary unit 26 may be a capacitor, for example. The switch 27 may be a thyristor switch, for example. When the power-generating auxiliary unit 26 is also capable of generating effective power, that is, when the unit is a set of batteries or a super capacitor or a combination thereof, the switch 27 is an inverter, for instance. The control unit 32 then controls the switch 27 to supply from the unit 26 idle power and effective power as needed. If required, it is possible to supply effective power from the set of batteries directly to the supplying AC network.

A DC/DC converter can be arranged between the super capacitor or set of batteries and the switch 27, when the switch 27 is an inverter, for instance. The typically rather low voltage of the super capacitor or set of batteries can then be increased to a higher level, and a high voltage increase thus need not be done by the inverter, with which this would be more difficult.

The electrical network 20 of the mine is the primary energy source of the mining vehicle. When the mining vehicle needs high power, additional energy is supplied from the power-generating auxiliary unit 26 for the mining vehicle to the electrical network 20 of the mine. For instance, during full-power drilling, additional energy may be obtained from said unit 26. It is possible to define in the control unit 32 a certain limit value, after which additional effective power is taken into use. By means of the power-generating auxiliary unit 26, the electric power taken from the network 20 can thus be limited to a certain level. Effective power and/or idle power supply can be taken into use to even out peaks in loading or transport vehicles at their maximum energy consumption level, that is, when they move uphill heavily loaded, for example.

One idea of the joint use of the power-generating auxiliary unit 26 and electrical network 20 is to ensure that the voltage of the electrical network 20 does not, due to overload, decrease below a limit set for the voltage of the electrical network, such as 5% below the nominal voltage. This way, it is possible to avoid voltage variations in the electrical network 20.

FIG. 2 also shows a transformer 33. The transformer 33 can be used to transform the voltage level of the electrical network 20 to suit the electrical system of the mining vehicle. If the voltage level of the electrical network 20 is already suitable for the electrical system of the mining vehicle, the transformer 33 is naturally not needed.

In the LCL filter 29, the coil $L_{f1}$ may be replaced by a transformer. With this transformer, the voltage levels of the electrical network and the arrangement compensating the idle power can be adapted to each other. The transformer may then be dimensioned according to the compensation power or charging power of the set of batteries, for instance.

The present equipment can also be used in such a manner that drilling or other work can be done for a short time by using the energy obtainable from the power-generating auxiliary unit 26, even if the electrical network 20 was not available. Further, the electrical network 20 can be used to run the mining vehicle, when the network cable is connected and, when the network is not in use, the power-generating auxiliary unit 26 can be used for running the vehicle. Instead of the connection cable 21 and reel 22, the mining vehicle 1 can be connected to the electrical network 20 in such a manner, for example, that the electrical network is a busbar system, to which the mining vehicle 1 is connected through current collectors.

The system can be controlled in such a manner, for example, that at most a certain defined maximum power is taken from the electrical network 20, and when this limit value is exceeded, the rest of the required power is taken from the power-generating auxiliary unit 26. In this case, the power that is taken from the unit 26 is thus typically adjusted. Further, it is possible to take all the power available from the power-generating auxiliary unit 26 and to adjust instead the power taken from the electrical network 20, or take all the required power from the power-generating auxiliary unit 26, if the electrical network is not available for some reason.

Figure 3:
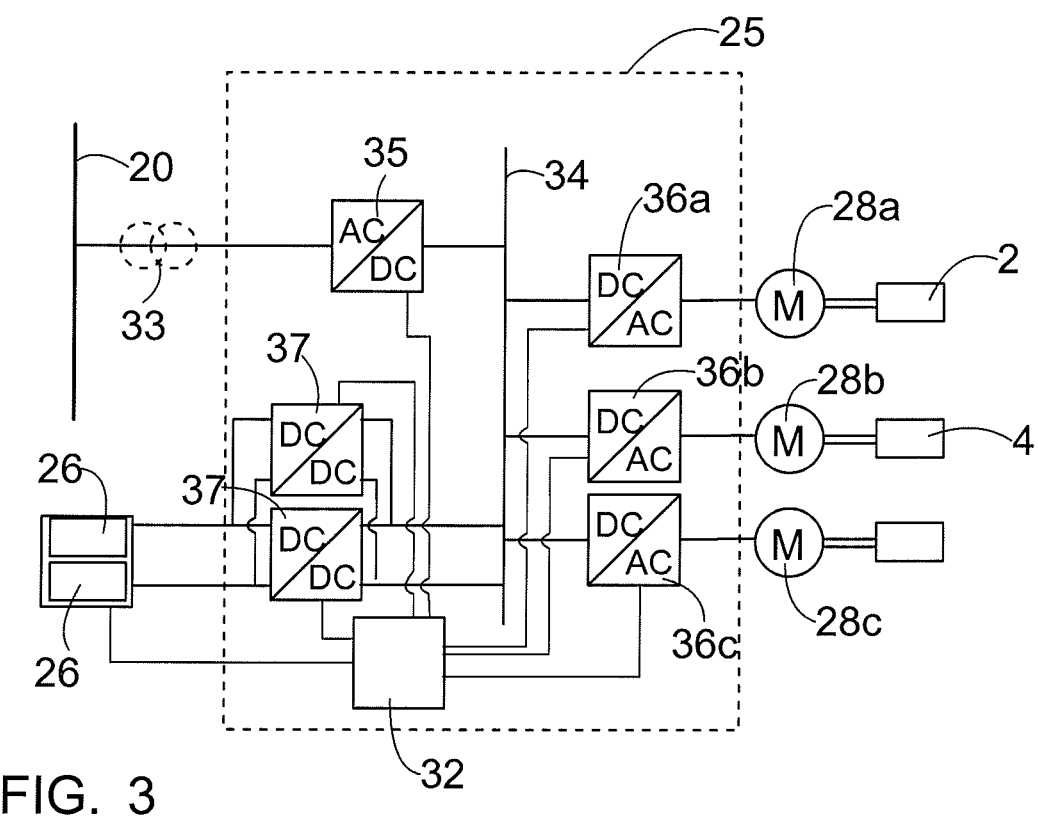
FIG. 3 is a diagram of a second energy supply arrangement of a mining vehicle.

In the solution of FIG. 3, electricity is supplied from the electrical network 20 to the alternating current motor 28 through a DC intermediate circuit 34. The power-generating auxiliary unit 26 is also connected to said DC intermediate circuit 34.

Electricity output from the electrical network 20 is connected to a rectifier 35. The rectifier 35 may be fixed or pulse ratio-controlled. The direct current partition of the rectifier 35 is connected to the DC intermediate circuit 34, that is, direct-voltage intermediate circuit. Inverters 36a to 36c are connected to the DC intermediate circuit 34 to convert direct current to alternating current and to supply alternating current power to alternating current motors 28a to 28c.

When using several inverters 36a to 36c connected to the same DC intermediate circuit 34, the supply voltage of the electric motors 28a to 28c connected to the inverters 36a to 36c may be changed arbitrarily. It is then also possible to adjust arbitrarily the rotation rate of each electric motor connected to the inverter. Thus, there may be one, two or more inverters 36a to 36c, which means that there may also be one, two or more electric motors. The control unit 32 may be arranged to the connecting device or outside it, if required.

In the embodiment of FIG. 3, the alternating current motor 28a is arranged to operate the mining work device 2. The alternating current motor 28b is in turn arranged to operate the driving equipment 4. The alternating current motor 28c can operate a water pump system, air pressure compressor system and auxiliary hydraulics system, for example. Each system can also be appointed its own alternating current motor, if necessary.

The power-generating auxiliary unit 26 is thus also connected to the DC intermediate circuit 34. The power-generating auxiliary unit 26 can also be connected directly to the DC intermediate circuit 34, but preferably the power-generating auxiliary unit 26 is connected to the DC intermediate circuit 34 with at least one DC/DC converter 37. The DC/DC converter adapts the voltage level of the power-generating auxiliary unit 26 to suit the DC intermediate circuit 34. Further, the DC/DC converter 37 manages the discharging and charging of the power-generating auxiliary unit 26 and acts as an active control element. Disparate power-generating auxiliary units 26 may be adapted to the intermediate circuit 34 of the device with the DC/DC converter 37. The power-generating auxiliary unit 26 is thus easy to replace, or there may be several power-generating auxiliary units in parallel, and the DC/DC converter 37 ensures their adaptation to the DC intermediate circuit 34. There may also be several DC/DC converters 37, and when one DC/DC converter 37 fails, the device may be driven utilizing another DC/DC converter. The embodiment of FIG. 3 shows two DC/DC converters 37 connected in parallel and two power-generating auxiliary units 26 connected in parallel. If one of the power-generating auxiliary units 26 fails, it can be left out of running and work can be continued utilizing one power-generating auxiliary unit at a lower power level. This increases the reliability of the mining vehicle and, during malfunctions, the mining vehicle can be moved out of the way without causing any risks to other mining traffic. After this, maintenance can be performed in a safer place. It is naturally possible to connect more than two DC/DC converters and/or power-generating auxiliary units in parallel.

Figure 4:
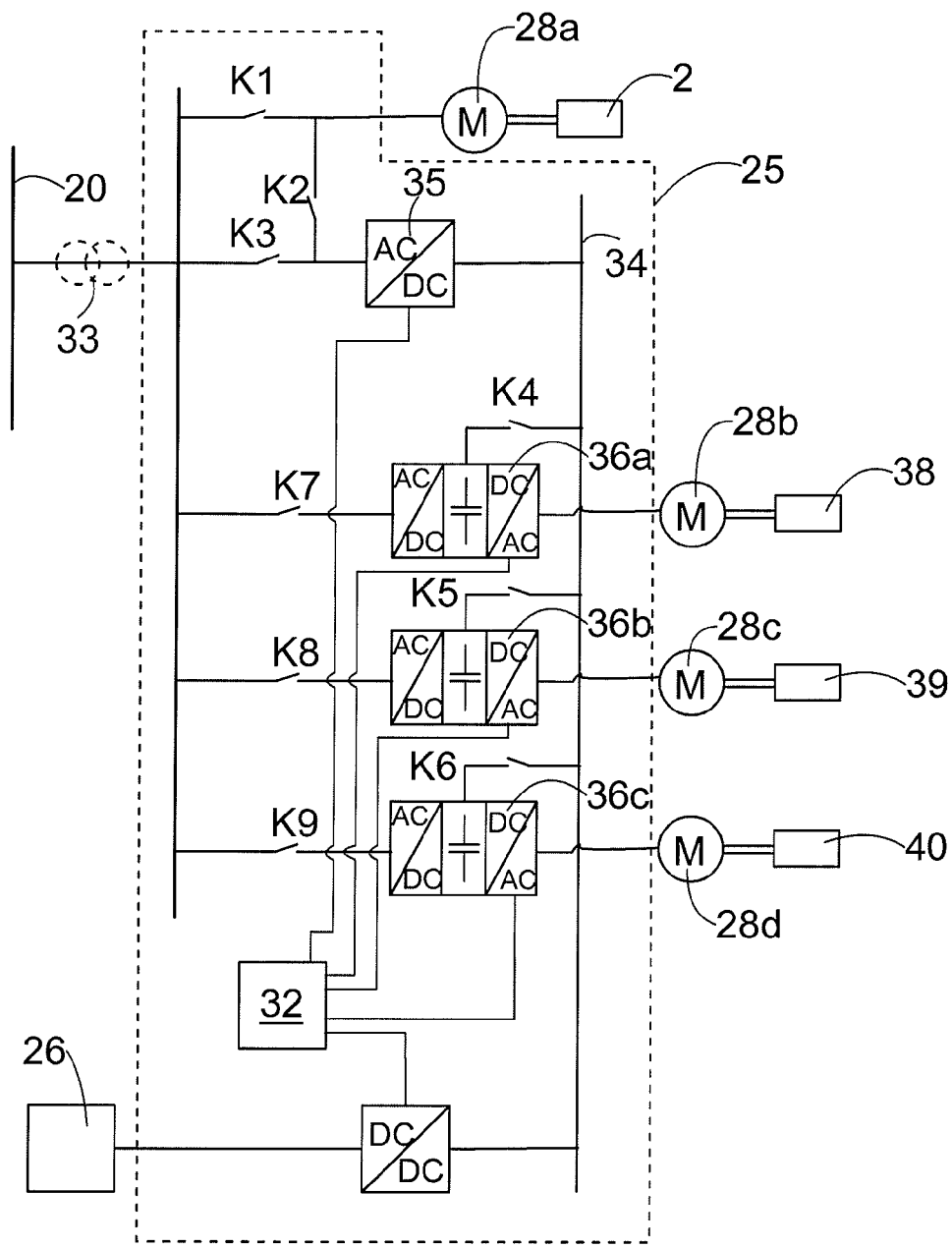
FIG. 4 is a diagram of a third energy supply arrangement of a mining vehicle.

In the embodiment of FIG. 4, the alternating current motor 28a operates main function of the mining work device. In a rock drilling rig, this main function may be its drilling machine. Further, the same alternating current motor 28a may be arranged to operate the driving equipment. There may also be more than one main function and alternating current motor 28a operating them.

The alternating current motors 28b to 28d operate the auxiliary functions of the mining vehicle. The alternating current motor 28b can operate the water pump system 38, the alternating current motor 28c may operate the air pressure compressor system 39, and correspondingly the alternating current motor 28d may operate the auxiliary hydraulics system 40, for example.

The control unit 32 controls the rectifiers, inverters, DC/DC converters, and switches. Measuring information on load situations, for instance, are transmitted to the control unit 32. For the sake of clarity, FIG. 4 does not illustrate the connection of the control unit 32 to switches K1 to K9, or the transmission of measuring information to the control unit 32.

In normal use, switches K1, K3, K4, K5, and K6 are controlled closed. Switches K2, K7, K8, and K9 are controlled open. All alternating current motors 28a to 28d can be supplied from the electrical network 20 except during peak loads. During a high load of the alternating current motor 28a operating the main function, effective power is supplied from the auxiliary unit 26 to the DC intermediate circuit 34. In such a case, the auxiliary unit 26 generates at least part of the power required by the alternating current motors 28b to 28d operating the auxiliary functions, and the network 20 is thus not loaded too much.

The rectifier 35 may charge the auxiliary unit 26 during a work cycle. Charging during a work cycle takes place when full power is not needed for the mining work device 2, that is, between full-power drilling when changing the borehole, drill rod or drill site, for instance.

The auxiliary unit 26 can also be used to compensate for idle power. On the other hand, idle power can also be compensated by the rectifier 35, which then is equipped with technology for compensating idle power.

If for some reason the electrical network 20 is not available, the alternating current motor 28a can also be supplied by the auxiliary unit 26. Then the switches K1 and K3 are controlled open and the switch K2 closed. Further, the rectifier 35 then serves as an inverter in a manner obvious to a person skilled in the art.

In the embodiment of FIG. 4, it is possible to bypass the DC intermediate circuit 34 in the supply of the alternating current motors 28b to 28d when supplying power to them from the electrical network 20. Then the switches K4, K5, and K6 are controlled open and, correspondingly, the switches K7, K8, and K9 are controlled closed.

More than one auxiliary unit 26 can be connected in parallel to the DC intermediate circuit 34. Further, one or more auxiliary units 26 can be connected to the DC intermediate circuit 34 directly, that is, without the DC/DC converter 37.

In a normal situation, the main function or the alternating current motor 28a operating the main function is thus supplied directly from the electrical network 20, that is, not through the DC intermediate circuit 34. Thus, the dimensioning of the DC intermediate circuit 34 can be made taking into consideration just the alternating current motors 28b to 28d operating the auxiliary functions and the charging of the auxiliary unit 26. Therefore, the DC intermediate circuit 34 need not be dimensioned on the basis of the total power of the mining vehicle.

In the attached figures, the electric motors are shown as alternating current motors, but instead direct current motors can also be used. As is obvious to a person skilled in the art, an inverter or inverters are then naturally not needed to supply them, and a rectifier is not necessary between the direct current motor and electrical network 20, for example, if the electrical network 20 is a direct current network.

The control unit may comprise a software product, the execution of which in the control unit 32 is arranged to provide at least some of the actions presented in this specification. The software product may be loaded into the control unit from a storage or memory medium, such a memory stick, memory disc, hard disc, information network server or the like, and the execution of the software product in the processor of the control unit computer or the like produces the actions described in this specification in the energy supply of the mining vehicle.

The solutions described in this specification may also be used when excavating tunnels. Tunnels are excavated in rounds. The work site is the face of the tunnel where boreholes are drilled and charged. Before the round is exploded, the rock drilling rig is moved away from the face to a safe point. After the explosion and after the exploded rock is removed, the rock drilling rig is driven from the safe point back to the face of the tunnel to drill another round. Tunnels are excavated in rounds, which means that a new drilling site, that is, new work site, is at a distance corresponding to the length of the round from the previous drilling site, that is, previous work site. The transfer drive is then from the previous work site via the safe point to the next work site.

It should be mentioned that in this specification, a mine refers to underground mines and opencast mines. Further, the method and mining vehicle may be used at contract work sites, such as when excavating different rock facilities. Therefore, a contract work site may also be considered a type of mine. At contract work sites an external electrical network may be modifiable, such as an aggregate on a movable carriage.

In some cases, the features described in this specification may be used as such, regardless of other features. On the other hand, the features described in this specification may also be combined to provide various combinations as necessary. Thus, the characteristics and features of the devices and properties shown in FIG. 4, for instance, may be similar to those described in FIGS. 2 and 3 using the same reference numbers.

The drawings and the related description are only intended to illustrate the idea of the invention. The invention may vary in its details within the scope of the claims.

The invention claimed is:

1. A mining vehicle having
    a carriage,
    driving equipment for moving the carriage,
    at least one mining work device, which is one of the following: rock drilling machine, bolting device, shotcrete apparatus, scaling device, injection device, blasthole charger, loading device, measuring device,
    at least one electric motor for operating a main function of the mining vehicle,
    at least one electric motor for operating an auxiliary function of the mining vehicle,
    a connecting device for connecting an electrical network of the mine to the mining vehicle,
    at least one power-generating auxiliary unit, and
    a control unit that is configured to connect the power-generating auxiliary unit to supply, when necessary, at least part of the power required by the electric motor operating the auxiliary function when simultaneously the at least one electric motor for operating the main function of the mining vehicle is supplied from the electrical network of the mine.

2. A mining vehicle as claimed in claim 1, wherein the power-generating auxiliary unit generates effective power.

3. A mining vehicle as claimed in claim 1, wherein the power-generating auxiliary unit is a set of batteries or super capacitor or a combination thereof.

4. A mining vehicle as claimed in claim 1, wherein at least one electric motor is an alternating current motor.

5. A mining vehicle as claimed in claim 4, wherein the mining vehicle comprises a DC intermediate circuit, to which electricity is supplied from the electrical network of the mine with a rectifier, and at least one inverter for supplying the electrical energy of the DC intermediate circuit to the alternating current motor operating the auxiliary function of the mining vehicle, in which case the power-generating auxiliary unit is connected to the DC intermediate circuit.

6. A mining vehicle as claimed in claim 5, wherein said rectifier has means for compensating idle power.

7. A mining vehicle as claimed in claim 5, wherein said rectifier is arranged to charge the power-generating auxiliary unit.

8. A mining vehicle as claimed in claim 5, wherein the mining vehicle has a DC/DC converter between the power-generating auxiliary unit and DC intermediate circuit for adapting the voltage level of the power-generating auxiliary unit and for connecting the power-generating auxiliary unit to supply energy to the DC intermediate circuit.

9. A mining vehicle as claimed in claim 1, wherein the mining vehicle is a rock drilling rig, in which case the main function of the mining vehicle consists of at least one rock drilling machine, and the auxiliary function of the mining vehicle consists of one or more of the following: a water pump system, air pressure compressor system and auxiliary hydraulics system.

10. A mining vehicle as claimed in claim 1, wherein the power generating auxiliary unit is connected in parallel to an alternating current motor.

11. A method for the energy supply of a mining vehicle with a carriage, drive equipment for moving the carriage, at least one mining work device, which mining work device is one of the following: rock drilling machine, bolting device, shotcrete apparatus, scaling device, injection device, blasthole charger, loading device, measuring device; at least one electric motor for operating a main function of the mining vehicle, at least one electric motor for operating an auxiliary function of the mining vehicle and at least one power-generating auxiliary unit, the method comprising connecting the at least one power-generated auxiliary unit, when necessary, to supply at least part of the power required by the electric motor operating the auxiliary function and simultaneously supplying the at least one electrical motor for operating the main function of the mining vehicle from an electrical network of the mine.

12. A method as claimed in claim 11, comprising supplying effective power from the power-generating auxiliary unit to the electric motor operating the auxiliary function.

13. A method as claimed in claim 11, wherein at least one electric motor is an alternating current motor.

14. A method as claimed in claim 13, wherein the mining vehicle comprises a DC intermediate circuit, to which electricity is supplied from the electrical network of the mine with a rectifier, and from which electricity is supplied to the at least one alternating current motor operating the auxiliary function of the mining vehicle, in which case the power-generating auxiliary unit supplies electric energy to the DC intermediate circuit when necessary.

15. A method as claimed in claim 14, comprising compensating the idle power of the mining vehicle with said rectifier.

16. A method as claimed in claim 14, comprising charging with said rectifier the power-generating auxiliary unit.

17. A method as claimed in claim 14, comprising adapting by means of a DC/DC converter the voltage level of the power-generating auxiliary unit to the DC intermediate circuit and the power-generating auxiliary unit to supply energy to the intermediate circuit.

18. A method as claimed in claim 11, comprising taking a certain defined maximum power from the electrical network, and when this limit value is exceeded, supplying the peak of the required effective power from the power-generating auxiliary unit.

19. A method as claimed in claim 11, wherein the main function or the at least one electric motor for operating the main function is supplied directly from the electrical network.

* * * * *